UNITED STATES PATENT OFFICE.

WILLIAM ZIEGLER AND JOHN H. SEAL, OF NEW YORK, N. Y., ASSIGNORS TO ROYAL BAKING-POWDER COMPANY, OF SAME PLACE.

IMPROVEMENT IN ARTICLES OF FOOD FROM CELERY.

Specification forming part of Letters Patent No. 146,629, dated January 20, 1874; application filed December 8, 1873.

*To all whom it may concern:*

Be it known that we, WILLIAM ZIEGLER and JOHN H. SEAL, of New York, N. Y., have invented a Process of Preparing Celery for Use in Food, of which the following is a specification:

The object of our invention is to supply the public with an acceptable and economical preparation of celery, whereby its delicate and agreeable flavor may be preserved in a suitable and convenient form for use in food, as a flavoring or relish, which constitutes a new manufacture.

The celery-plant, in its green state, is found in ditches throughout Europe, but, in its wild condition, is rank, coarse, and even poisonous; but, by cultivation, it becomes sweet, crisp, and juicy, embodying a flavor which is almost universally approved. It is grown only in portions of the United States. Owing to its perishable nature, the vegetable is not procurable in all seasons of the year, and is, therefore, only accessible to those living in such sections of the country in which it is cultivated.

Our invention, therefore, consists in gathering this green vegetable from its best sources in seasonable portions of the year, and preparing it for commerce in a more economical, convenient, healthful, and portable form, and by which it is preserved ready for use in all seasons of the year, in all sections of the country.

Among the advantages attained by our process may be mentioned that, by utilizing all and every part of the plant, its stalks, roots, or bulbs, &c., we are enabled to produce a flavor equal in strength and quality at a much-reduced cost to the consumer.

Another superior advantage possessed by this preparation consists in the fact that it has a wider adaptation for use in food than the green vegetable, and may be used for many domestic purposes where it is impracticable to use the unprepared article. For instance, the prepared article is at all times convenient to be sprinkled upon, and the flavor at once imparted to, any kind of cooked or uncooked solid or liquid food, such as meats, cold meats, oysters, soups, gravies, &c., and, by being taken into the stomach in this form, is without any of the injurious results which often follow the use of the green vegetable on account of its indigestibility when the stalks have become too ripe or stale in the markets.

The process which we have successfully employed is as follows: The stalks, stems, seeds, roots, or bulbs of the celery-plant are first cleaned by hand or suitable machinery, removing all sand and dirt. We next desiccate by drying on the floor of a kiln, or in a drying-room heated by steam-pipes or other suitable means, at a temperature of from 140° to 160° Fahrenheit. We then grind them in a suitable mill, reducing them to a flour or fine powder. We use the stalks, stems, seeds, roots, or bulbs either separately or mixed together, as may be cheapest or best suited to the particular result desired.

We have three modes of putting it up ready for use. The first mode is to put up the clear powdered celery in suitable bottles, cans, or other packages. Our second mode is to mix it, in the proper proportions, either with salt, pepper, starch, or any other suitable wholesome substance which may serve to preserve it, and render suited to the different purposes for which it may be required. Our third mode is to make a solution by mixing the celery in the powdered form, as above described, with vinegar or other liquids, and, by the addition of pepper, salt, and other suitable substances, in such proportions as will render it palatable and suited to the different tastes of the public, to form a celery sauce, which we preserve by sealing hermetically in bottles or cans.

Having thus described our process, we desire to state that we do not confine ourselves to any positive or definite mode of putting up the celery for edible purposes.

What we claim, and desire to secure by Letters Patent, is—

Celery stalks, stems, seeds, roots, or bulbs, powdered, or in any manner disintegrated, dissolved, or prepared, either in their natural state or mixed with salt, or any other edible substance suitable for the purposes set forth, and put up in cruets, bottles, or other packages for convenience of the consumer and the trade, as a new commercial article.

W. ZIEGLER.
                        JOHN H. SEAL.

Witnesses:
    ALFRED W. LOWERRE,
    F. H. LOWERRE.